Feb. 11, 1969 G. P. WECKLER 3,427,461
STORAGE MODE OPERATION OF A PHOTOSENSOR
Filed Feb. 23, 1966

INVENTOR.
GENE P. WECKLER,
BY [signature] [signature]
ATTORNEYS

3,427,461
STORAGE MODE OPERATION OF A PHOTOSENSOR

Gene P. Weckler, Campell, Calif., assignor to Fairchild Camera and Instruments Corporation, Syosset, N.Y., a corporation of Delaware Filed Feb. 23, 1966, Ser. No. 529,358
U.S. Cl. 250—211 8 Claims
Int. Cl. H01j *39/12, 31/50*

ABSTRACT OF THE DISCLOSURE

A photosensor device for sensing radiant energy including a transistor and an energizing means coupled to the transistor for periodically charging the space-charge capacitance of one of the transistor junctions, the charged capacitance remaining after the removal of the energizing means to prevent leakage currents from flowing from the one junction through the other junction during the intervening periods when the one junction is not being charged.

This invention relates to a photosensor device and a method of operating such a device.

Solid-state elements, such as diodes and transistors, have been commonly employed as photosensors. Recently, it was realized that there is a significant advantage in operating a diode in what is referred to as the storage mode of operation. The storage mode involves reverse biasing the p-n junction of a diode to charge the associated depletion layer capacitance. The diode is then open circuited and the capacitance discharges at a rate proportional to the radiant power impinging on the p-n junction. The charge required to restore the voltage across the junction is a measure of the impinging radiant energy. Thus, in the storage mode of operation, the radiant power impinging upon the junction is integrated for a period $T_o$ (which is referred to as the scan time). The time between the commencement of repeated charging of the diode junction is referred to as the repetition period $T_p$. The time period in which the junction is charged is referred to as the sample time $\Delta t$. The ratio $T_o/\Delta t$ is the approximate gain obtained in the storage mode of operation. From this brief explanation, it can be seen that the advantages of the storage mode of operation are: (1) an output signal having a linear dependence on the impinging radiant energy; (2) a substantial gain in the output signal as compared with a simple p-n junction photosensor; (3) the ability to detect several orders of magnitude of radiant energy by adjusting the sample and scan times without loss of other desirable characteristics; and (4) a compatability with sequential or random accessing of one and two dimensional arrays of elements.

The practical use of the storage mode of operation has only recently been achieved. One obstacle to this has been the lack of practical switches to open circuit the diode during the discharge of the space-charge capacitance in a manner that leakage currents do not significantly discharge the space-charge capacitance and substantially affect the measure of incident radiation. The problem is compounded by the additional requirements that the switch must operate at high speed and provide a low-impedance charging path. It is also desirable that the switch be compatible with semi-conductor large array fabrication. One prior art switching system shown in U.S. Patent No. 3,011,089 employs an electron-beam gun to switch an array of diodes. The use of a relatively complex electron-beam gun as a switch decidedly limits the application of this device. Another arrangement as shown in U.S. patent application Ser. No 434,916, filed Feb. 24, 1965, by Louis J. Kabell and assigned to the assignee of this application, overcomes many of the prior art problems by employing a metal-oxide-silicon transistor (MOST) and diode in combination.

This invention overcomes the shortcomings of prior art devices in a simple, practical and effective manner. Briefly, the structure of the invention comprises a transistor and an energizing means coupled to the transistor for repeatedly charging the space-charge capacitance of one junction of the transistor and for preventing leakage currents from said one junction via the other junction when the one junction is not being charged.

Briefly, the method of the invention for sensing radiant energy comprises impinging radiant energy on a transistor and operating said transistor in a storage mode. The use of a transistor enhances the output signal in proportion to the beta of the transistor, provides a low-impedance charging path, and a very high-impedance discharge path. The structure may be readily integrated into a single body of semi-conductor material by employing well-known photoengraving and diffusion techniques.

The above generally-described structure method and advantages, along with other advantages of this invention, are described in the detailed description which follows and the accompanying drawings, wherein.

Figure 1:
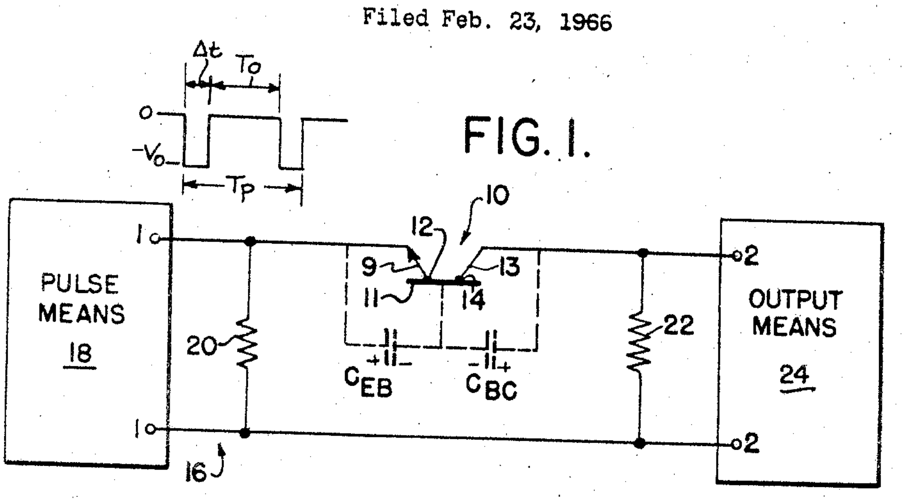
FIG. 1 is an electrical schematic circuit diagram of the invented photosensor.

Referring to FIG. 1, the invented photosensor comprises a transistor 10, an enerization means 16 and an output means 24. The transistor 10 is shown as an NPN transistor but a PNP transistor would operate as well provided the necessary polarity changes were made in energization means 16 and output means 24. Transistor 10 has an emitter 9 and a base 11 forming a first junction 12 (e.g., emitter-base junction) and a collector 13 which along with base 11 form a second junction 14 (e.g., collector-base junction). The capacitances $C_{EB}$ and $C_{BC}$ associated with the emitter-base junction and the collector-base junction, respectively, are shown external to the transistor structure as broken lines, in order to simplify the description of the operation of the invented device which appears later in the specification. The transistor 10 preferably takes the form of a double-diffused planar transistor. In such a transistor with both junctions 12 and 14 reversed biased, the DC impedance of emitter-base junction 12 will be much greater than that of the base-collector junction 14. Stated another way, since the generation recombination current of a reverse-biased junction depends directly upon the junction area and directly upon the space-charge width, it is possible in a double-diffused structure to make the leakage current of the reverse-biased emitter-base junction much less than that of the reverse-biased collector-base junction. This is because the emitter area is always much less than the collector area in such a structure and, secondly, because the space-charge width of an emitter-base junction in a double-diffused structure is also much less than that of a base-collector junction when at the same voltage. The emitter-base junction, therefore, isolates the base-collector junction from the rest of the circuit during the scan time $T_o$ (FIG. 1). Typically, the ratio of emitter-base to collector-base leakage current would be approximately 1:100 (i.e., two orders of magnitude difference). In general, the area of the collector-base junction is at least twice that of the emitter-base area.

Energization means 16 is coupled to transistor 10 and functions repeatedly to charge the space-charge capacitance $C_{BC}$ of junction 14 and to prevent leakage from the charged junction 14 via junction 12 when junction 14 is not being charged. The energization means 16 comprises pulse means 18, matching resistor 20, and load resistor 22. The repeated charging of junction 14 is accomplished by pulse means 18 which repeatedly and periodically supplies a pulse to the emitter of transistor 10 to forward bias junction 12. In the case of an NPN transistor, pulse means 18 supplies a negative polarity pulse having an amplitude $-V_0$ to the emitter of transistor 10 (FIG. 1), while in the case of a PNP, a positive polarity pulse is supplied. The pulse means 18 may take the form of any of the well-known circuits employed to provide a periodic pulse of amplitude $-V_0$; period $T_0+\Delta t$; and pulse width $\Delta t$, as shown in FIG. 1. The time $\Delta t$ is determined by the value of the base-collector junction capacitance $C_{BC}$, the value of resistor 22, and the common emitter gain of the transistor structure, as is known in the art. It is sometimes desirable for pulse width $\Delta t$ to be long enough to allow the transient condition created by the energization with a pulse amplitude $-V_0$ to die away. Typically, the pulse associated with the time $\Delta t$ is in the micro-second range and has well-defined leading and trailing edges. The period $T_0+\Delta t$ is determined by the range of illumination levels one wishes to detect, the generation-recombination current, and the value of the voltage $V_0$. The maximum value of the voltage $V_0$ is determined by the breakdown voltage of the emitter-base junction 12. The pulse width $\Delta t$ and the pulse amplitude $-V_0$ should be relatively constant (FIG. 2).

The remaining portion of energization means 16 is formed by an impedance network comprising resistors 20 and 22. The network 20 and 22 cooperates with junction 12 to prevent leakage from the charged junction 14 via junction 12 when junction 14 is not being charged by the pulses supplied by pulse means 18. When the pulse from pulse means 18 is terminated, junctions 12 and 14 are reverse biased. Resistor 20, which provides a DC return path around the circuit loop, may be considered as part of pulse means 18, or as a terminating resistor across terminals 1—1. The value of resistor 20 depends on the particular device and the particular application. Resistor 22 serves as a load resistor across terminals 2—2 for the purpose of signal recovery. It is desirable to have the ratio of resistor 22 to resistor 20 large since the voltage amplitude of the output signal depends upon this ratio. The value of resistor 22 is restricted by the speed of operation desired as it in part determines the speed of operation which may be achieved.

An output means 24 is coupled across resistor 22 and functions to manifest an effect representative of the charge supplied to junction 14 of transistor 10 during the supply of pulses to the emitter of transistor 10. The output means may take the form of a device, such as an oscilloscope, providing a visual indication or it may be some circuit that forms part of a video system or a circuit that forms part of a computer. Thus, output means 24 may take the form of any of the well-known signal display or utilization devices.

Figure 2:
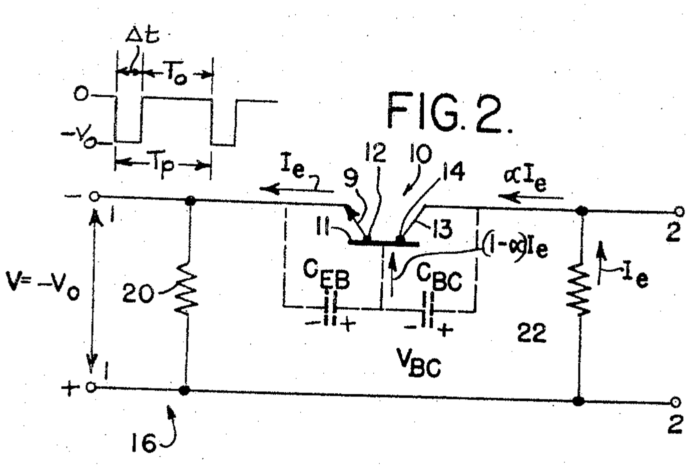
FIG. 2 is a partial electrical schematic of the photosensor device shown in FIG. 1 with a sample pulse supplied thereto; and, FIG. 3 is a partial electrical schematic of the photosensor device shown in FIG. 1 with the pulse terminated (during scan time).
Figure 3:
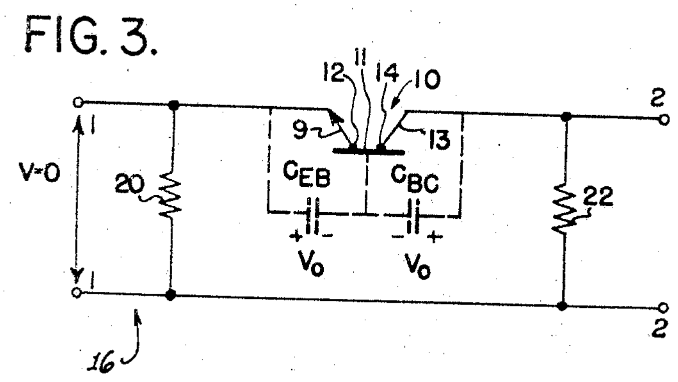

The operation of the photosensor device will now be considered with reference to FIGS. 1–3. The pulse means 18 repeatedly and periodically supplies a pulse of negative polarity $-V_0$ to the emitter of transistor 10 to forward bias junction 12 and provide a low-impedance path to junction 14 (FIG. 1). The pulse width $\Delta t$ is long enough to allow the transient condition to cease and permit a steady-state condition. With the sum of the voltage drops around a closed loop being zero, it can be seen that the voltage drop across the reverse-biased junction 14 plus the drop across resistor 22 must be equal to the voltage $-V_0$ (assuming the drop across the forward-biased emitter-base junction to be negligible). During the steady-state condition, the current through resistor 22 will be very small and substantially all of the pulse voltage will appear across the base-collector junction 14, thus charging the junction capacitance $C_{BC}$ to a voltage of approximately $-V_0$ as shown in FIG. 2. Thus, the negative polarity pulse results in the base of transistor 10 having a negative potential with respect to the collector, thereby reverse biasing junction 14 to charge the space-charge capacitance of that junction. At the end of the pulse time $\Delta t$, with the capacitance $C_{BC}$ charged to voltage $V_0$, the voltage at input electrode to the emitter goes to zero as does the voltage at the collector electrode. This results in the voltages across both the base-collector junction 14 and the emitter-base junction 12 being $-V_0$, assuming junction 12 has a breakdown greater than $-V_0$. Thus, junctions 12 and 14 are both in a reverse bias condition with the junction 12 providing a very high impedance and essentially an open circuit to the charge stored in junction 14. The operation of junction 12 very closely approaches that of an ideal switch. During the period which both junctions 12 and 14 are reverse biased (i.e., the scan time $T_0$), the voltage on junction 14 will decay, due to the generation-recombination current in the space-charge region, and also due to any optically generated carriers constituting a photocurrent which reach the space-charge region of junction 14. These two currents tend to discharge the capacitance $C_{BC}$ of junction 14 which initially had a charge $(C_{BC})(-V_0)$ on it. Generally, the photogenerated current is much greater than the generation-recombination current. Thus, the charge lost from the space-charge capacitance of junction 14 during the scan time $T_0$ is directly proportional to the integral of the incident light over the period $T_0$. At a subsequent time another pulse having a voltage of $-V_0$ is applied to the emitter of transistor 10 and a displacement current flows to replenish the charge lost from junction 14 due to the discharging currents during the scan time $T_0$. This displacement current is a majority carrier current to the base, hence the emitter injects minority carriers to neutralize the space charge in the base region. This is normal transistor action and the ratio of charge that flows through resistor 22 to charge supplied to capacitance $C_{BC}$ is $(\beta+1)$ where $\beta$ is the standard common emitter current gain of the transistor.

It may be helpful to the understanding of the invention to consider the operation of the device with reference to a number of the physical relations that describe its operation. With a negative voltage applied to terminals 1—1 as shown in FIG. 2, a forward bias will be placed on emitter-base junction 12. Since the voltage on junction 12 cannot change instantaneously because of the capacitance $C_{BC}$, the emitter will begin to inject a current $I_e$. In this condition, the emitter-base junction has a high conductance and the current which flows in collector 13 will be $\alpha I_e$ where $\alpha$ is the fraction of injected emitter current which is collected by the collector. Typically, $\alpha$ may have a value in the range of 0 to .9999. The base current is $(1-\alpha)I_e$ and must equal the capacitance displacement current $$C_{BC}\frac{dV_{CB}}{dt}$$

This results in both emitter and collector current depending on the rate of change of the collector-base voltage. The current that flows through resistor 22 is the sum of the collector current and a base current and is equal to the current $I_e$.

In a time $\Delta t$, a charge equal to the time integral of $(1-\alpha)I_e$ from time 0 to $\Delta t$ is put on the base-collector capacitance $C_{BC}$ and the charge through the load resistor 22 is the time integral of $I_e$ from 0 to $\Delta t$. The ratio of charge through the load to charge placed on the base-collector capacitance $C_{BC}$ turns out to be $(\beta+1)$. At the termination of the negative voltage, the base-collector capacitance $C_{BC}$ is charged and the base-collector junction is isolated from the rest of the circuit as a result of the low leakage currents permitted by the emitter-base junction.

So far we have discussed only how to charge the base-collector junction and then isolate this charged junction. The charge which has been placed on this junction will decay at a rate that is proportional to the level of incident illumination. For zero illumination, it will take in the order of seconds for this charge to decay to half its initial value. Under such circumstances (zero illumination), the decay time is governed by the relationship that generation-recombination current equals capacitive-displacement current. That is $$C\frac{dV}{dt}=-I_{gr}$$

where:

C=junction capacitance
$dV/dt$=rate of charge of voltage
$I_{gr}$=generation-recombination current Since both capacitance and generation-recombination current depend directly on junction area, the area cancels out of the equation and the rate of change of voltage is independent of area. Under illumination, the photogenerated current adds to the generation-recombination current to remove more charge per unit time. Since the photogenerated current depends directly on the illumination level, the amount of charge removed per unit time also depends directly on illumination level as long as the photogenerated current is large compared to the generation-recombination current. During the scan time $T_0$, a quantity of charge will be removed from the base-collector capacitance—the magnitude of which is equal to the time integral of photogenerated current integrated over the scan time $T_0$. When the base-collector junction is recharged, a quantity of charge equal to $(\beta+1)$ times the above quantity will flow through resistor 22. Hence, a signal gain is obtained.

In summary, the photosensor described above with reference to FIGS. 1–3 provides a low-impedance path through junction 12 for charging the space-charge capacitance of junction 14. It provides a very high-impedance path approaching an ideal switch by the reverse biasing of junction 12 during the scan time $T_0$. The use of transistor 10 further provides a gain beyond that normally provided in the storage mode operation, thereby improving the signal-to-noise ratio. All of this is accomplished with a minimum of complexity and in a manner consistent with present processing technology. The described photosensor device may be fabricated in the form of integrated circuit arrays.

What is claimed is:

1. A photosensor device for sensing radiant energy comprising:

a transistor connected to operate in the storage mode; and, an energizing means coupled to said transistor for periodically charging the space-charge capacitance of one junction of said transistor, the charged capacitance remaining after the removal of said energizing means to prevent leakage currents from flowing from said one junction through the other junction during the intervening periods when said one junction is not being charged.

2. The structure recited in claim 1 including an output means for manifesting an effect representative of the charge supplied said one junction during the charging of said one junction.

3. The structure recited in claim 1 wherein said transistor is a planar double-diffused transistor.

4. The structure recited in claim 3 wherein the area of said one junction is at least twice that of the other junction.

5. The structure recited in claim 1 wherein said one junction has a given DC reverse-bias impedance and said other junction has a DC reverse-bias impedance at least an order of magnitude greater than said given impedance.

6. A photosensor device for sensing radiant energy comprising:

a transistor connected to operate in the storage mode having a first p-n junction and a second p-n junction;

a means coupled to said transistor for repeatedly supplying a pulse to said transistor to forward bias said first junction and to reverse bias the second junction;

a network for reverse biasing said first junction and for maintaining said second junction in a reverse-biased state when said pulse is not supplied by the pulse means; and output means for manifesting an effect representative of the charge supplied to said transistor during the repeated supply of pulses thereto.

7. A method for sensing radiant energy comprising:

energizing a transistor connected to operate in the storage mode to forward bias one junction and reverse bias another junction to charge the space-charge capacitance of the reverse-biased junction;

discontinuing said energization to enable said one junction to become reverse-biased; and re-energizing said transistor to again forward bias said one junction and to recharge the space-charge capacitance of the other junction, said charge required to recharge said other junction being representative of the radiant energy impinging on the transistor.

8. The method for sensing radiant energy recited in claim 7 wherein discontinuing said energization maintains said other junction in a reverse-biased condition.

References Cited

UNITED STATES PATENTS

| | | | |
|---|---|---|---|
| 3,005,107 | 10/1961 | Weinstein ------- | 317—235.27 |
| 3,348,074 | 10/1967 | Diemer ---------- | 317—235.27 |
| 3,378,688 | 4/1968 | Kabell. | |

RALPH G. NILSON, *Primary Examiner.*

C. LEEDOM, *Assistant Examiner.*

U.S. Cl. X.R.

307—311; 250—213; 317—235, 27